United States Patent

Kempf

Patent Number: 6,052,978

Date of Patent: Apr. 25, 2000

[54] ENSILAGE HARVESTER VARIABLE SPEED FEED ROLL DRIVE

[75] Inventor: Bernd Kempf, Althornbach, Germany

[73] Assignee: Deere & Company, Moline, Ill.

[21] Appl. No.: 09/274,053

[22] Filed: Mar. 22, 1999

[30] Foreign Application Priority Data

Mar. 21, 1998 [DE] Germany ............................ 198 12 500

[51] Int. Cl.⁷ ............................ A01D 45/02; A01D 57/01
[52] U.S. Cl. .................................. 56/119; 56/504; 475/1; 241/101.742; 198/604; 198/791
[58] Field of Search ................................... 475/1, 5, 6, 72; 56/119, 504, 94, 53, 16.4 R; 198/835, 604, 624, 789; 241/101.742, 605, 222, 34

[56] References Cited

U.S. PATENT DOCUMENTS

| | | | |
|---|---|---|---|
| 3,523,411 | 8/1970 | Waldrop et al. | 56/344 |
| 3,670,590 | 6/1972 | Long et al. | 56/11.2 X |
| 4,049,207 | 9/1977 | Storm et al. | 241/101.762 |
| 4,073,377 | 2/1978 | Stossel et al. | 198/624 |
| 4,223,846 | 9/1980 | Priepke et al. | 241/101.742 X |
| 4,259,881 | 4/1981 | Meyerle | 475/72 |
| 4,426,043 | 1/1984 | Martenas | 241/101.2 |
| 4,585,115 | 4/1986 | Lindblom et al. | 475/154 X |
| 5,186,692 | 2/1993 | Gleasman et al. | 475/72 X |

FOREIGN PATENT DOCUMENTS

| | | |
|---|---|---|
| 0794360 | 10/1997 | European Pat. Off. . |
| 28 19 200 C2 | of 0000 | Germany . |
| 2176852 | 1/1987 | United Kingdom . |

*Primary Examiner*—Charles A Marmor
*Assistant Examiner*—Ankur Parekh

[57] ABSTRACT

A drive transmission for the feed rolls of a forage harvester includes a planetary gear set arranged such that an input shaft drives the sun gear while a further input shaft is provided by a reversible, variable speed motor that is connected to the ring gear of the planetary gear set so as to effect speed and direction changes in the output of the planetary gear set that is defined by the planet carrier. Thus, the length of cut of crop products fed to the cutterhead by the feed rolls is controlled by varying the speed of the motor in order to vary the delivery speed of the feed rolls.

9 Claims, 3 Drawing Sheets

ENSILAGE HARVESTER VARIABLE SPEED FEED ROLL DRIVE

BACKGROUND OF THE INVENTION

The invention relates to a feeding device of an agricultural machine such as a forage harvester wherein the feeding device includes a gear transmission to which is coupled either a hydraulically or electrically driven motor.

DE-C2-28 19 200 shows an ensilage harvester having a feeding device that includes several rolls mounted on parallel axes for feeding harvested crop material to a cutterhead. The feed rolls are grouped in two sets of two and are driven via a spur gear train, with each set of rolls being driven by a hydraulic motor. Both hydraulic motors are fed by a variable displacement hydraulic pump, and depending on the displacement, may deliver a slower or faster initial speed, whereby the length of the cut of the crop material is varied. Such a drive requires the hydraulic pump and motors to be of high efficiency, and, because of the volume of fluid required to be pumped for chopping to the capacity of the machine, for there to be a cooler for the hydraulic fluid.

It is also known to drive the feed rolls of the feeding device in a purely mechanical manner by way of intermediate gearing that may be selectively shifted or with replaceable gears so as to achieve different drive speeds of the feed rolls in order to vary the length of cut of the crop material delivered to the cutterhead.

The underlying problem addressed by the invention is that, in the known driving arrangements for the feeding device, an easy, infinite adjustment of the crop material delivery speed, and, hence, the cutting length, is not possible without the expense of relatively high capacity, high efficiency hydrostatic transmissions.

SUMMARY OF THE INVENTION

According to the present invention there is provided an improved drive for the feed rolls of a forage harvester.

An object of the invention is to provide a mechanical feed roll drive which can be easily adjusted to vary the speed at which the feed rolls deliver crop materials to the cutterhead and, in that way, vary the length of cut.

A more specific object of the invention is to provide a mechanical feed roll drive including a planetary gear set arranged such that a relatively small motor may be coupled for driving one of the elements of the planetary gear set so as to vary the driving speed of the feed rolls.

DESCRIPTION OF THE PREFERRED EMBODIMENT

Figure 1:
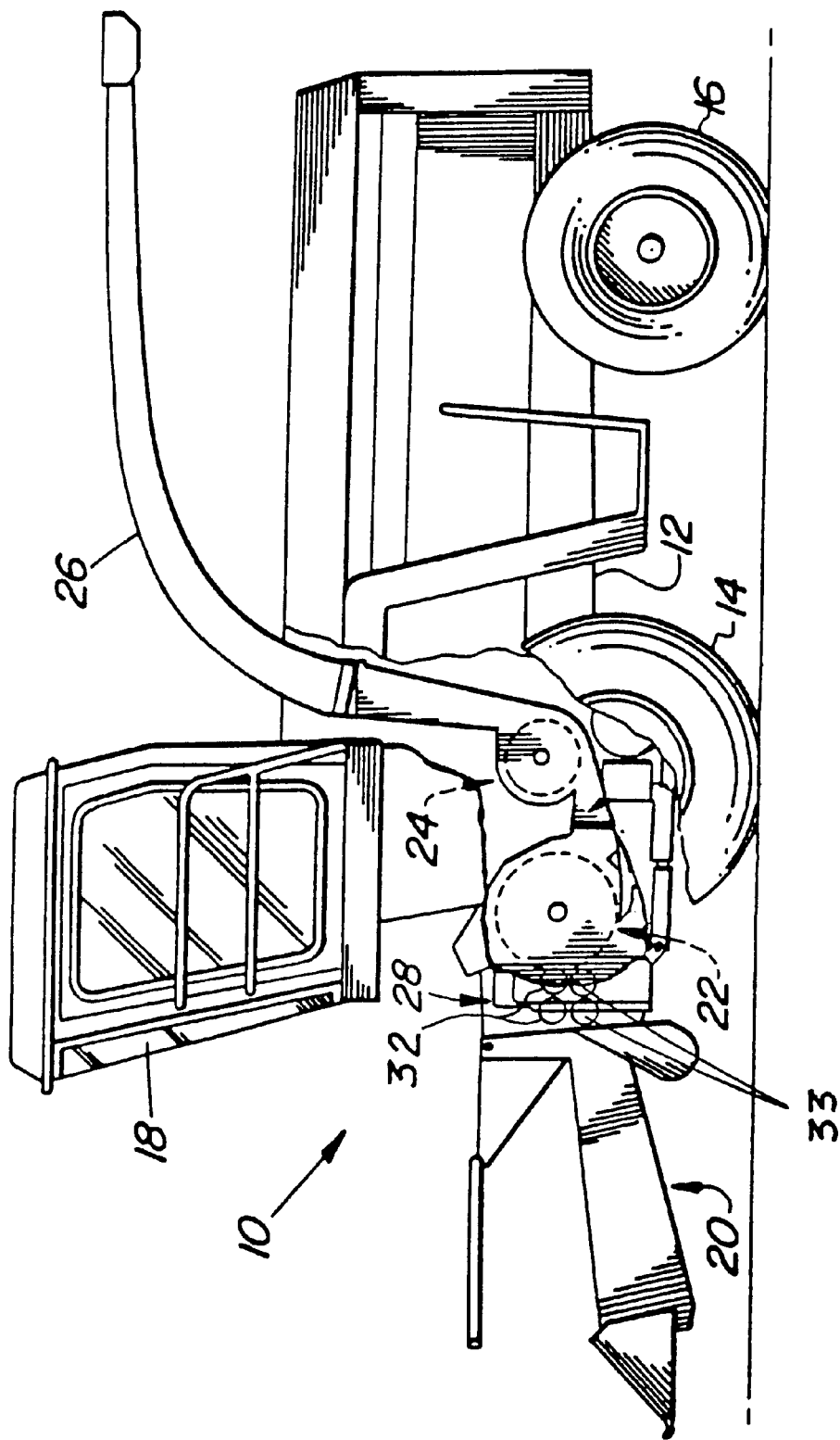
FIG. 1 is a somewhat schematic, left side elevational view of a self-propelled forage harvester, with parts broken away.

An agricultural machine 10, shown in FIG. 1 in the form of a self-propelled forage harvester, has a frame 12 supported on a pair of front wheels 14 and a pair of rear wheels 16. The operation of the agricultural machine 10 takes place from an operator's station located within a cab 10 mounted at a forward end of the frame 12 and from which it is possible to view a crop header 20 during operation. Harvested crop gathered by the header 20 is cut into short pieces by a cutterhead 22 and is thrown by means of a blower 24 through a discharge chute 26 into an accompanying receptacle of a trailed collector vehicle, not shown. Between the header 20 and the cutterhead 22 is a feed roll assembly 28 including a drive transmission 30 (FIGS. 2 and 3) and upper and lower pairs of rolls 32 and 33 respectively arranged for rotating about parallel axes and which guide harvested crop between them in a plane which is essentially horizontal where the crop passes over a shear bar (not shown) and is cut or chopped into lengths by cutter knives of the rotating cutterhead 22. It can be seen and it is known that the length to which the crop is cut depends on the conveyance speed of the rolls 32 and 33 of the feed roll assembly 28.

Figure 2:
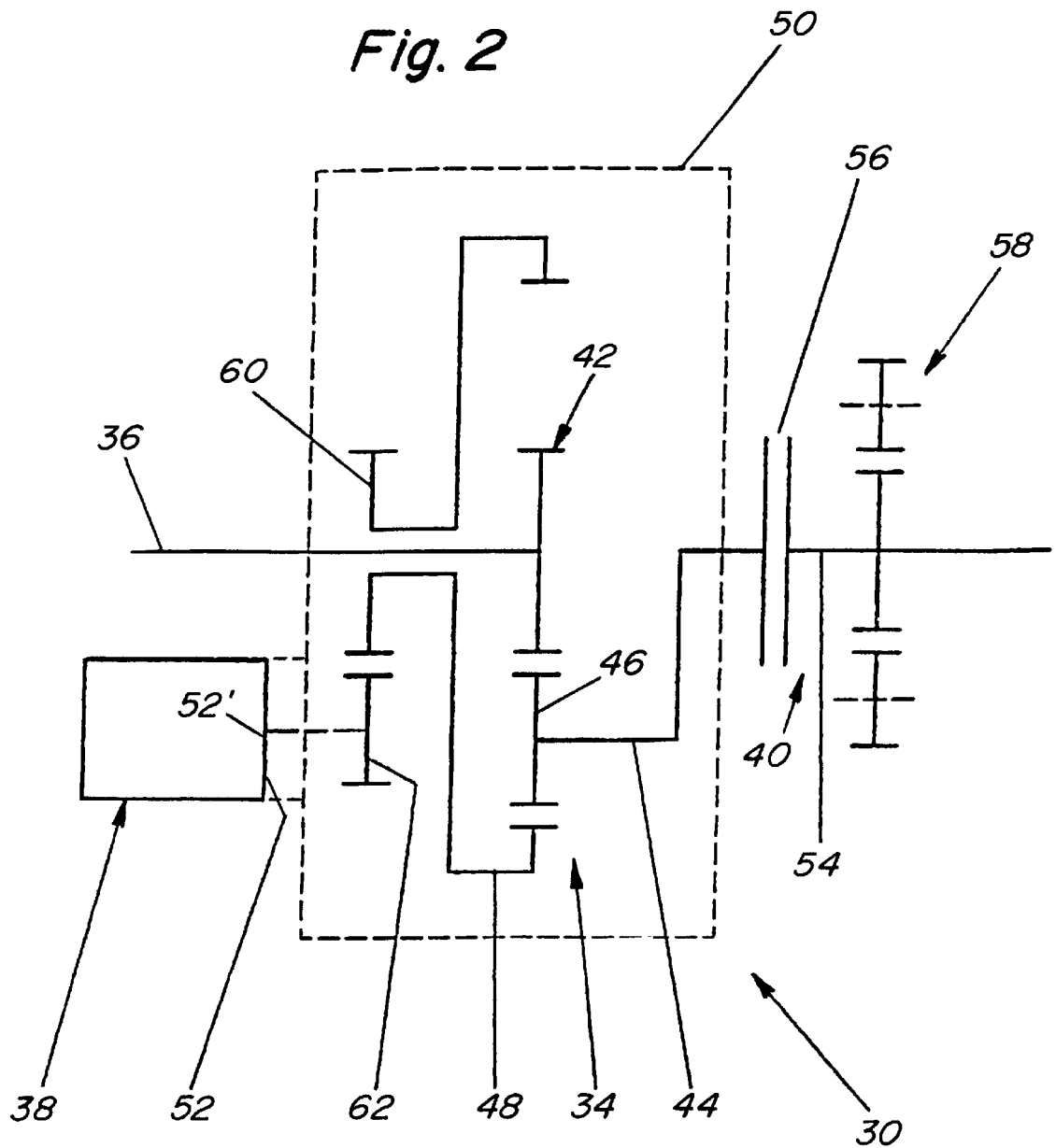
FIG. 2 is a schematic representation of a drive device for the feed rolls of the forage harvester.

Referring now to FIG. 2, it can be seen that the transmission 30 includes a gear train 34, an input shaft 36, a speed modifying motor 38 and an output drive assembly 40. The gear train 34 is constructed as a planetary gear set including a sun gear 42, a planet carrier 44 including planet gears 46 and a ring gear 48, with these gears of the planetary gear set being located in a housing 50.

The sun gear 42 is fixed to the input shaft 36, which is rotatably mounted to the housing 50, in a manner well known in the art, as are the ring gear 48 and the planet carrier 44. The input shaft 36 extends through a central area of the bell-shaped ring gear 48 and receives its power from a chain or belt drive or through means of toothed wheel gearing, for example.

The motor 38 is driven separately from the input shaft 36 and is preferably a hydraulic motor coupled to a variable displacement pump by hydraulic lines, in a manner not shown but well known in the art. A suitable hydraulic motor is one that has a nominal output of approximately 10 KW and with a variable output rate. The control of the rate of revolution may take place by varying the displacement of the pump feeding control fluid to the motor, this varying displacement being controlled in accordance with the reduction or increase in the amount of crop material being conveyed to the cutterhead 22. The motor 38 includes a housing having a flange facing 52 corresponding to a flange facing 52' of the transmission housing 50, with bolts joining the facings together to thus mount the motor 38 to the housing 50.

The output drive 40 includes a shaft 54, a coupling 56 and a gear set 58 for dividing output power between the upper and lower sets of feed rolls 32 and 33, respectively. The coupling 56 serves to selectively couple the output of the planetary gear set 30 with the shaft 54. The coupling 56 may be a clutch of the positive locking type, such as a jaw clutch, or may be a friction type, such as a disc clutch. The coupling 56 may also assume the function of an overload coupling.

The power-dividing gear set 58 is in the form of a spur gear or a looping gear system, i.e., it is such that corresponding to the number of rolls, the gears are made to rotate with each other and turn synchronously in order to drive the sets of rolls 32 and 33. In this way, the harvested crop is moved in the manner of a mat between the upper and lower sets of rolls 32 and 33 and is brought into the path of rotation of the cutter head 22 where the crop is cut into pieces having lengths dependent on the peripheral speed of the sets of rolls 32 and 33.

As stated above, the sun gear 42 is fixed to the input shaft 36. The planet carrier 44 is rotated, on the one hand, by the planet gears 46 and connects, on the other hand, to the coupling 56 in order to drive the output shaft 54 when the coupling 56 is engaged. The planet gears 46 are meshed with the sun gear 42 and ring gear 48, and thus revolve about the sun gear 42, with the direction of rotation and the speed of the carrier 44 being determined by the ratio of the rate of revolution of the sun gear 42 and the ring gear 48 to each other. In the preferred example, three planet gears 46 are provided, however, it is also possible to have more or fewer than this number.

Located inside the ring gear 48 is the planet gears 46, the planet carrier 44 and the sun gear 42, and joined for rotation with the ring gear 48 is a toothed gear 60 that is meshed with a toothed gear 62 that is fixed to an output shaft of the motor 38.

Based on the description of the representation in the drawings so far, the following function results.

The input shaft 36 is driven so as to rotate the sun gear 42 at a constant rate of revolutions. The planet gears 46 roll along the sun gear 42 and rotate the planet carrier 44, with the speed and direction of the carrier depending on the relative speeds of the sun gear 42 and the ring gear 48. The planet carrier 44 drives the shaft 54 via the coupling 56 and thus the power dividing gear set 58 and with it the sets of feed rolls 32 and 33. The motor 38 drives the ring gear 48 via the toothed gears 62 and 60 so that a certain gear ratio results in the planetary gear set 34. In order to change the peripheral speed of the upper and lower sets of feed rolls 32 and 33 so as to achieve a change in the length of cut of the harvested crop processed by the cutterhead 22, the ring gear 48 is turned via the motor 38 either faster or more slowly, so that the gear ratio of the planetary gear set 34 changes. Thus, this change takes place in a continuous manner in a relatively large range without the need for a high power output by the motor 38.

Depending on the output power to be transferred by the planetary gear set 34 and the range within which the rate of revolution is to be changed, motors 38 of varying output power and speed range may be mounted with their respective flange faces 52 to the flange face 52' of the housing 50.

While in the preferred embodiment the motor 38 is coupled for driving the ring gear 48 and the output from the planetary gear set 34 is by way of the planet carrier 44, it is to be understood that it is possible for the motor 38, the input drive shaft 36 and the output shaft from the planetary gear set 34 to be coupled to the sun gear 42, ring gear 48 and carrier 44 in any desired operational manner.

Figure 3:
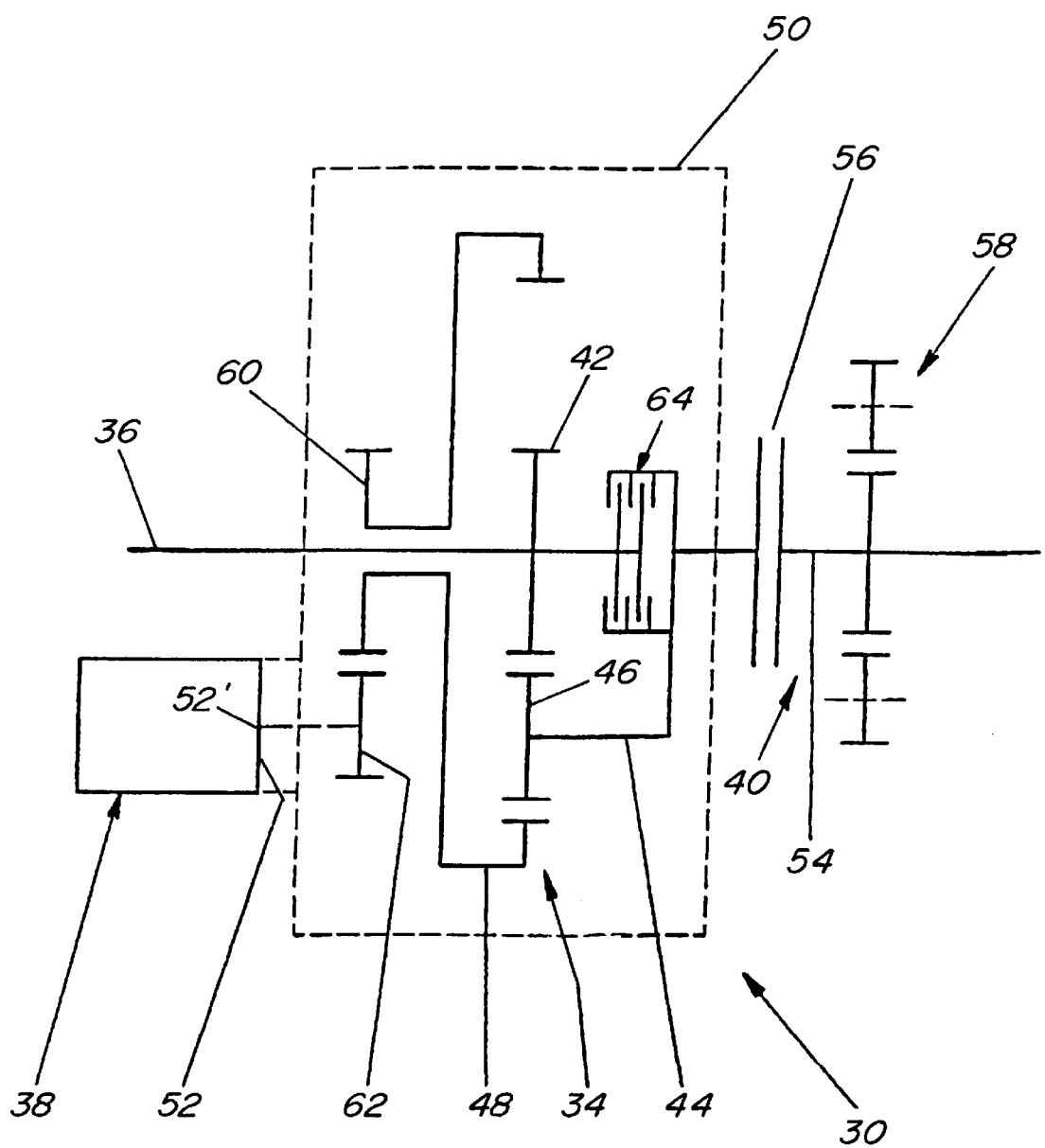
FIG. 3 is a schematic representation of a second embodiment of the drive device.

Referring now to FIG. 3, there is shown a slightly different embodiment of the feed roll drive 30, it being noted that elements like those shown in FIG. 2 are given the same reference numerals. Specifically, the feed roll drive 30 shown in FIG. 3 differs from that of FIG. 2 in that it includes a second coupling 64 which is fixed to the planet carrier 44 and also on the output side with the driving or input side of the coupling 56. On the other hand, this coupling may establish a connection to the input drive shaft 36 and the sun gear 42, it being noted that the input shaft 36 is extended with respect to how its shown in FIG. 2. In this way, the entire planetary gear set 34 may be locked such that the speed of the output shaft 54 is that of the input shaft 36. If additionally, the input shaft 36 is disconnected or separated from its drive source, it is possible to produce with the motor 38 a direct drive at the coupling 56 and output shaft 54, with the speed being variable and in selected forward or reverse directions. This effect may be used, for example, for driving the cutterhead 22 by its drive connection with the feed roll assembly 28 when it is desired to rotate the cutterhead 22 either forward or backward for sharpening the blades of the cutterhead.

In this way, due to the mechanical gearing in the planetary gear set 34, a high degree of efficiency is achieved while changes in speed and direction can easily be effected by the motor 38 with just a small power input thereby making it possible to use a relatively small motor which may be either hydraulic or electrical. If changes in the power delivered by the motor 38 is desired, this can easily be accomplished by mounting a different motor to the gear housing 50 by removing the attaching hardware securing the flange facings 52 and 52' together.

What is claimed is:

1. In a forage harvester including a rotary cutterhead located downstream from, and to which crop is fed, by a crop feeding device having at least one rotary driven crop conveying element, the improvement comprising: a variable speed drive transmission for said at least one crop conveying element including a planetary gear set comprising at least three components including a sun gear, a planet gear arrangement with a carrier and a ring gear; an input shaft coupled to a first of said three components; an output shaft coupled to a second of said three components and to said at least one rotary driven crop conveying element; and a variable speed motor coupled for driving said third component of said planetary gear set at various selected speeds so as to affect the speed of said output shaft and, hence, said at least one rotary driven crop conveying element to thereby affect the length to which crop is cut by said cutterhead.

2. The variable speed drive defined in claim 1 wherein said first component is said sun gear, said second component is said carrier and said third component is said ring gear.

3. The variable speed drive defined in claim 1 wherein said motor is a hydraulic motor.

4. The variable speed drive defined in claim 1 wherein said output shaft is coupled to said rotary driven crop conveying element through a selectively releasable coupling.

5. The variable speed drive defined in claim 1 wherein a selectively releasable coupling is provided for coupling said input shaft directly to said output shaft.

6. The variable speed drive defined in claim 1 or 5 wherein said motor is a reversible motor.

7. The variable speed drive defined in claim 1 wherein an input gear is fixed to said ring gear for rotation with said ring gear about said input shaft; and an input pinion gear being meshed with said input gear and coupled to an output shaft of said motor.

8. The variable speed drive defined in claim 7 wherein said carrier is coupled to said output shaft.

9. The variable speed drive defined in claim 8 wherein a first selectively releasable coupling is located between said input shaft and said carrier and a second selectively releasable coupling is located in said output shaft between said carrier and said at least one rotary driven crop conveying element.

* * * * *